United States Patent
Sherman et al.

(10) Patent No.: US 8,577,007 B2
(45) Date of Patent: Nov. 5, 2013

(54) CALL SHUFFLING

(75) Inventors: Itay Sherman, Hod Hasharon (IL); Eyal Bychkov, Hod Hasharon (IL); Hagit Perry, Herzilya (IL); Uri Ron, Tel Aviv (IL)

(73) Assignee: Google Inc., Mountain View, CA (US)

( * ) Notice: Subject to any disclaimer, the term of this patent is extended or adjusted under 35 U.S.C. 154(b) by 1443 days.

(21) Appl. No.: 12/187,966

(22) Filed: Aug. 7, 2008

(65) Prior Publication Data

US 2009/0041221 A1 Feb. 12, 2009

Related U.S. Application Data

(60) Provisional application No. 60/964,233, filed on Aug. 9, 2007.

(51) Int. Cl.
*H04M 3/42* (2006.01)

(52) U.S. Cl.
USPC .................................. 379/210.01

(58) Field of Classification Search
USPC ........... 379/210.01, 355.02, 201.01; 455/564, 455/414.1
See application file for complete search history.

(56) References Cited

U.S. PATENT DOCUMENTS

| | | | |
|---|---|---|---|
| 5,628,055 A | 5/1997 | Stein | |
| 5,754,962 A * | 5/1998 | Griffin | 455/569.2 |
| 6,201,867 B1 | 3/2001 | Koike | |
| 6,243,578 B1 | 6/2001 | Koike | |
| 6,690,947 B1 | 2/2004 | Tom | |
| 6,898,283 B2 | 5/2005 | Wycherley et al. | |
| 7,085,542 B2 | 8/2006 | Dietrich et al. | |
| 7,194,257 B2 * | 3/2007 | House et al. | 455/418 |
| 7,194,285 B2 | 3/2007 | Tom | |
| 8,009,678 B2 * | 8/2011 | Brooke | 370/395.42 |
| 2003/0112948 A1 * | 6/2003 | Brown et al. | 379/207.04 |
| 2003/0215077 A1 * | 11/2003 | Hagiwara | 379/210.01 |
| 2004/0192270 A1 * | 9/2004 | Kreitzer | 455/414.1 |
| 2004/0233930 A1 | 11/2004 | Colby, Jr. | |
| 2005/0010693 A1 * | 1/2005 | Sinclair et al. | 709/250 |
| 2005/0070225 A1 | 3/2005 | Lee | |
| 2005/0159184 A1 | 7/2005 | Kerner et al. | |
| 2006/0035632 A1 * | 2/2006 | Sorvari et al. | 455/418 |
| 2006/0105722 A1 | 5/2006 | Kumar | |
| 2006/0241353 A1 | 10/2006 | Makino et al. | |
| 2007/0004450 A1 | 1/2007 | Parikh | |
| 2007/0018957 A1 | 1/2007 | Seo | |
| 2007/0135110 A1 * | 6/2007 | Athale et al. | 455/418 |
| 2007/0161404 A1 | 7/2007 | Yasujima et al. | |

(Continued)

FOREIGN PATENT DOCUMENTS

| | | |
|---|---|---|
| EP | 1871075 A1 | 12/2007 |
| WO | 0059247 A1 | 10/2000 |
| WO | 0186922 A1 | 11/2001 |
| WO | 03103174 A1 | 12/2003 |

*Primary Examiner* — Duc Nguyen
*Assistant Examiner* — Sonia Gay
(74) *Attorney, Agent, or Firm* — Soquel Group LLC (57) ABSTRACT

A method for automatically scheduling phone calls, including dynamically assigning priorities to each of a plurality of a user's contacts, selecting one of the plurality of the user's contacts based on highest priority, wherein random selection is used in case more than one contact has the highest priority, placing a phone call to the selected contact, and updating the priority of the selected contact, if the placing a phone call successfully reaches the selected contact. A telephone and a computer-readable storage medium are also described and claimed.

40 Claims, 6 Drawing Sheets

(56) References Cited

U.S. PATENT DOCUMENTS

| | | | |
|---|---|---|---|
| 2007/0263843 A1* | 11/2007 | Foxenland | 379/355.02 |
| 2007/0264972 A1* | 11/2007 | Stark | 455/410 |
| 2008/0056269 A1* | 3/2008 | Madhani et al. | 370/395.2 |
| 2008/0075251 A1* | 3/2008 | Jefferson et al. | 379/142.07 |
| 2008/0123829 A1* | 5/2008 | Smith et al. | 379/142.17 |
| 2008/0140886 A1 | 6/2008 | Izutsu | |

* cited by examiner

CALL SHUFFLING

PRIORITY REFERENCE TO RELATED APPLICATIONS

This application claims benefit of U.S. Provisional Application No. 60/964,233, entitled CALL SHUFFLING, filed on Aug. 9, 2007 by inventors Itay Sherman, Eyal Bychkov, Hagit Perry and Uri Ron.

FIELD OF THE INVENTION

The present invention relates to automated scheduling of phone calls.

BACKGROUND OF THE INVENTION

People often find themselves in situations where they have a large number of phone calls to make. A salesperson, for example, may have a large number of contacts to follow up on with phone calls. Or a professional returning to his office from vacation may find a large number of phone messages on his answering machine which require return phone calls. Or a person may want to stay in touch with a large number of friends and family on a regular basis, and call them from time to time.

When such people have free time, and would like to use the time to make some of their phone calls, it is cumbersome to sort out who to call. Free time may arise sporadically when people are waiting for a service or for an appointment. Free time may also arise in predictable ways when people are exercising or traveling on a train or taxi. Even when people write themselves notes of phone calls to make, using computerized calendars or slips of paper, the notes are not always available with them during their free time. Or the notes may be extensive and difficult to sort through and prioritize.

Thus it would be of advantage to have an automated way of making phone calls during free time.

SUMMARY OF THE DESCRIPTION

The present invention provides a simple and efficient way for a person to automatically schedule phone calls to make, whenever he has free time to make some of his calls. The present invention provides a call shuffler that arranges the person's calls that have to be made in order of priority, and places the calls. The person does not have to sort through and review his notes to determine what calls to make.

The present invention organizes a person's contacts into groups, one group being contacts that a person wants to call. The contacts are assigned priorities based on factors including inter alia importance, deadlines and special dates such as birthdays and anniversaries, and length of time since the person last spoke with a contact. Whenever the person has free time, the contacts are sorted in terms of priority, contacts with the same priority are randomly sorted, and phone calls are placed accordingly.

Priorities are updated dynamically, when factors influencing priorities change, and after phone calls are made.

There is thus provided in accordance with an embodiment of the present invention a method for automatically scheduling phone calls, including dynamically assigning priorities to each of a plurality of a user's contacts, selecting one of the plurality of the user's contacts based on highest priority, wherein random selection is used in case more than one contact has the highest priority, placing a phone call to the selected contact, and updating the priority of the selected contact, if the placing a phone call successfully reaches the selected contact.

There is additionally provided in accordance with an embodiment of the present invention a telephone with an automatic call scheduler, including a memory for storing a plurality of a user's contacts and priorities assigned thereto, a prioritizer coupled with the memory for dynamically assigning the priorities to the plurality of the user's contacts, and for updating the priority of a contact when a phone call is successfully made to the contact, a scheduler coupled with the prioritizer and with the memory for selecting one of the plurality of the user's contacts based on highest priority, wherein the scheduler uses random selection in case more than one contact has the highest priority, and a dialer coupled with said scheduler for automatically placing a phone call to the selected contact.

There is moreover provided in accordance with an embodiment of the present invention a computer readable storage medium storing program code for causing a telephone to dynamically assign priorities to each of a plurality of a user's contacts, to select one of the plurality of the user's contacts based on highest priority, wherein random selection is used in case more than one contact has the highest priority, to place a phone call to the selected contact, and to update the priority of the selected contact, if the placed phone call successfully reaches the selected contact.

BRIEF DESCRIPTION OF THE DRAWINGS

The present invention will be more fully understood and appreciated from the following detailed description, taken in conjunction with the drawings in which.

DETAILED DESCRIPTION

The present invention relates to automatic phone call scheduling for some or all of a user's contacts. The user's telephone stores his list of contacts, and includes a profile for each contact. Shown in TABLE I is a sample contact profile, in accordance with the present invention. In addition to the contact's name, phone number and relation to the user, the contact profile includes fields for preferred calling dates and times, excluded calling dates and times, one or more special occasions and desired frequency of calls.

The contact profile also includes a free-text field for storing comments. The free-text field may include reminders as to why the user wants to speak with the contact. The contact profile also includes a schedule call flag. Setting the schedule call flag to ON indicates that the user would like to call the contact when he has the time to do so. For example, the contact may be waiting for a return phone call from the user, or the contact may be someone the user wants to stay in touch with professionally or personally.

TABLE I

Sample Contact Profile

| | |
|---|---|
| Name | John Smith |
| Phone Number | 123-456-7890 |
| Relation | Friend |
| Preferred calling dates & times | Sundays, 12 PM-2 PM |
| Excluded calling dates & times | Fridays, 8 AM-10 AM |
| Last time called | Jun. 20, 2007, 12:32:12 |
| Special occasion | Birthday, Apr. 1, 1975 |
| Desired frequency of calls | Every second day |
| Free-text | Invite John to the barbeque on Saturday |
| Schedule call flag | ON |
| Status | Busy |

Figure 1:
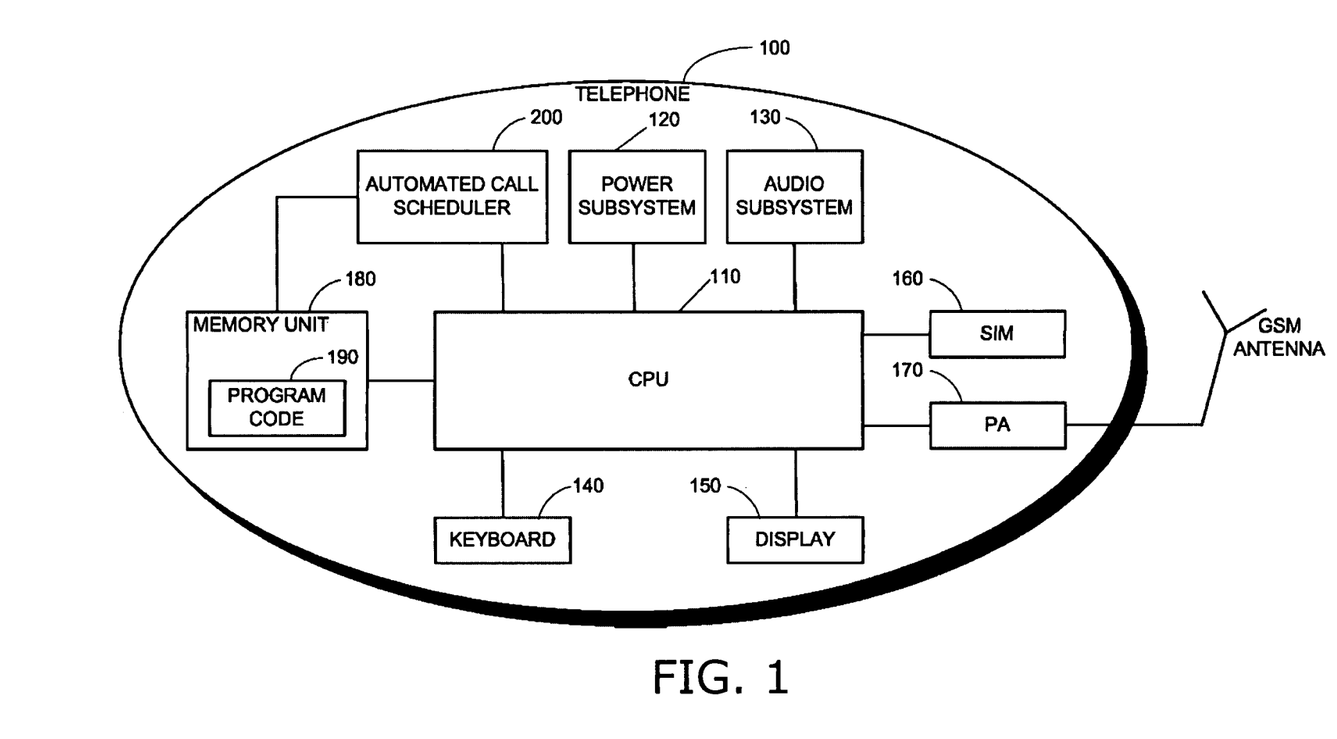
FIG. 1 is a simplified block diagram of a telephone with automated call scheduling, in accordance with an embodiment of the present invention.

Reference is now made to FIG. 1, which is a simplified block diagram of a telephone 100 with automated call scheduling, in accordance with an embodiment of the present invention. Telephone 100 may be a land-line telephone or a cellular telephone. Telephone 100 is operated by a user, or by a number of users.

As shown in FIG. 1, telephone 100 includes a central processing unit (CPU) 110, a power subsystem 120, an audio subsystem 130, a keyboard 140 for user input, a display 150 for output, a SIM card 160, and a power amplifier 170. Power subsystem 120 generally includes a rechargeable battery. Keyboard 140 generally includes a small keypad for dialing phone numbers and entering SMS messages. Display 150 is generally a small LCD display. Power amplifier 170 is connected to a GSM antenna.

Telephone 100 also includes a memory unit 180, which stores user data such as contact information for the user's contacts, SMS messages and phone settings. In accordance with an embodiment of the present invention, user contact information is imported from external databases, such as Facebook® databases managed by Facebook, Inc. of Palo Alto, Calif, or databases from such other social or dating services.

Memory unit 180 also stores program code 190 that executes application programs, such as an Internet browser and a personal organizer. In accordance with the present invention, program code 190 also executes an automated call scheduler 200, which is used to schedule and dial telephone calls.

Figure 2:
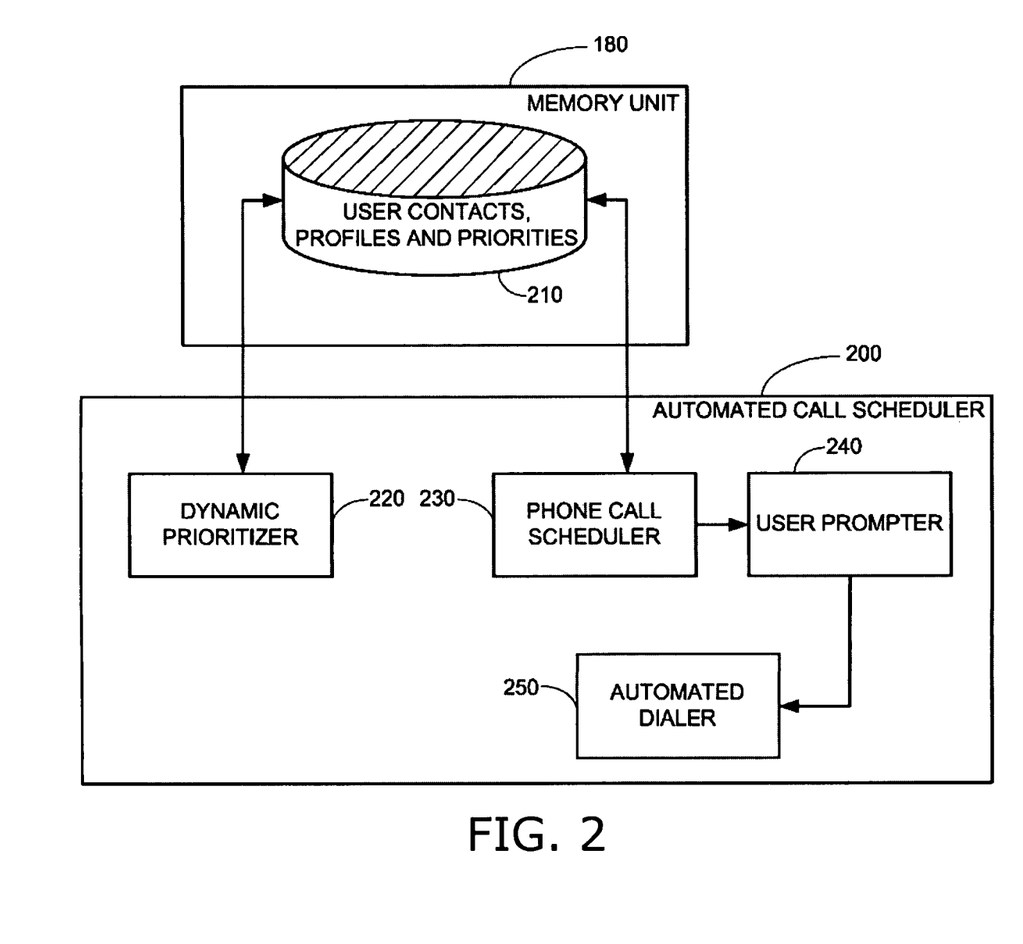
FIG. 2 is a simplified block diagram of an automated call scheduling component of the telephone of FIG. 1, in accordance with an embodiment of the present invention.

Reference is now made to FIG. 2, which is a simplified block diagram of automated call scheduler 200 of telephone 100 of FIG. 1, in accordance with an embodiment of the present invention. Shown in FIG. 2 is a data store 210, within memory unit 180, which stores a user's contacts and their profiles. Some or all of the contacts are designated by the user as being "shuffle-able"; i.e., contacts that the user would like to call when he has free time to do so. For example, the user may designate that contacts that are waiting for a reply phone call from him are shuffle-able. He may also designate that certain friends and family are shuffle-able, as a way of staying in touch with them. In accordance with an embodiment of the present invention, a contact is designated as shuffle-able by setting the schedule call flag in the contact's profile to ON.

A dynamic prioritizer 220 dynamically assigns a priority to each of the user's shuffle-able contacts, based on a variety of factors. The priorities assigned to the contacts are stored in data store 210, together with the contacts' profiles. The factors influencing the calculation of a contact's priority include inter alia:

a special date relating to the contact, such as the contact's birth date or wedding anniversary, or Mother's Day or Father's Day;

the time remaining until a designated deadline for calling the contact;

the time elapsed since the user last spoke with the contact;

the desired frequency for which the user wishes to speak with the contact;

a metric of importance assigned to the contact;

a status of the contact, such as "busy", "available", "running" and "on another phone call";

contact's preferred dates and times to call him; and contact's excluded dates and times to call him.

In accordance with an embodiment of the present invention, telephone 100 includes an activation button for activating automated call scheduler 200. Thus, when the user has free time to make some of his calls, he may activate automated call scheduler 200 by pressing on the activation button. Phone call scheduler 230 then dynamically sorts the shuffle-able contacts in terms of their priorities, and selects the highest priority contact for placing a phone call. In case multiple contacts have the highest priority, phone call scheduler 230 chooses randomly among them. As such, in a case where all priorities are the same, phone call scheduler 230 uses random selection among all the shuffle-able contacts.

After selecting a shuffle-able contact to be called, a user prompter 240 notifies the user of the selected contact, for his confirmation. Such notification may be visually or vocally, or both. User prompter 240 is configured to present information from the selected contact's profile to the user, to remind the user why he wanted to call the selected contact, and to assist the user in deciding whether to confirm or decline making the call. Information presented to the user by prompter 240 may include inter alia the free-form text from the selected contact's profile, the last date and time that the user made a phone call to the selected contact, and any special occasion related to the selected contact.

If the user confirms the call, then an automated dialer 250 places the call. If the phone call to the selected candidate is successful, then phone call scheduler updates the contact's priority appropriately. An unsuccessful phone call to a contact is a call for which a busy signal is reached, or for which the contact is not available. In accordance with an embodiment of the present invention, success or non-success of a call is measured by the duration of the call. Calls with duration over 15 seconds, for example, may be deemed successful.

Generally a contact's priority is reset to a low value after a successful call to the contact is made. However, in certain cases the contact's priority may remain high, such as when the user needs to call the contact back again in order to finish the discussion. The call may have been cut off, or the user or the contact may have run out of time, or the user may need to get more information from the contact.

It will thus be appreciated by those skilled in the art that the telephone of FIG. 2 enables the user to manage a large number of phone calls that he would like to make, and automatically select one or more phone calls whenever the user has free time to speak with his contacts.

In an embodiment of the present invention, the user's shuffle-able contacts may be grouped in categories, such as "sports contacts", "family contacts" and "dating contacts". When activating automated call-scheduler 200, the user may designate a specific group of contacts, in which case phone call scheduler 230 selects from among the designated group of shuffle-able contacts.

In some embodiments of the present invention, telephone 100 is implemented as a modular cell phone that attaches to other electronic devices. There are two general types of devices to which the modular cell phone may be attached; namely, jackets and hosts. A jacket is a device that provides a user interface for the modular cell phone, enriches the capabilities of the modular cell phone, and is not able to operate independently when the modular cell phone is not pouched therewith. Conversely, a host is a device that is able to operate independently when the modular cell phone is not pouched therewith, and whose capabilities are enriched by the modular cell phone when the modular cell phone is attached thereto. Generally a host does not have communication functionality independent of the modular cell phone.

Figure 3:
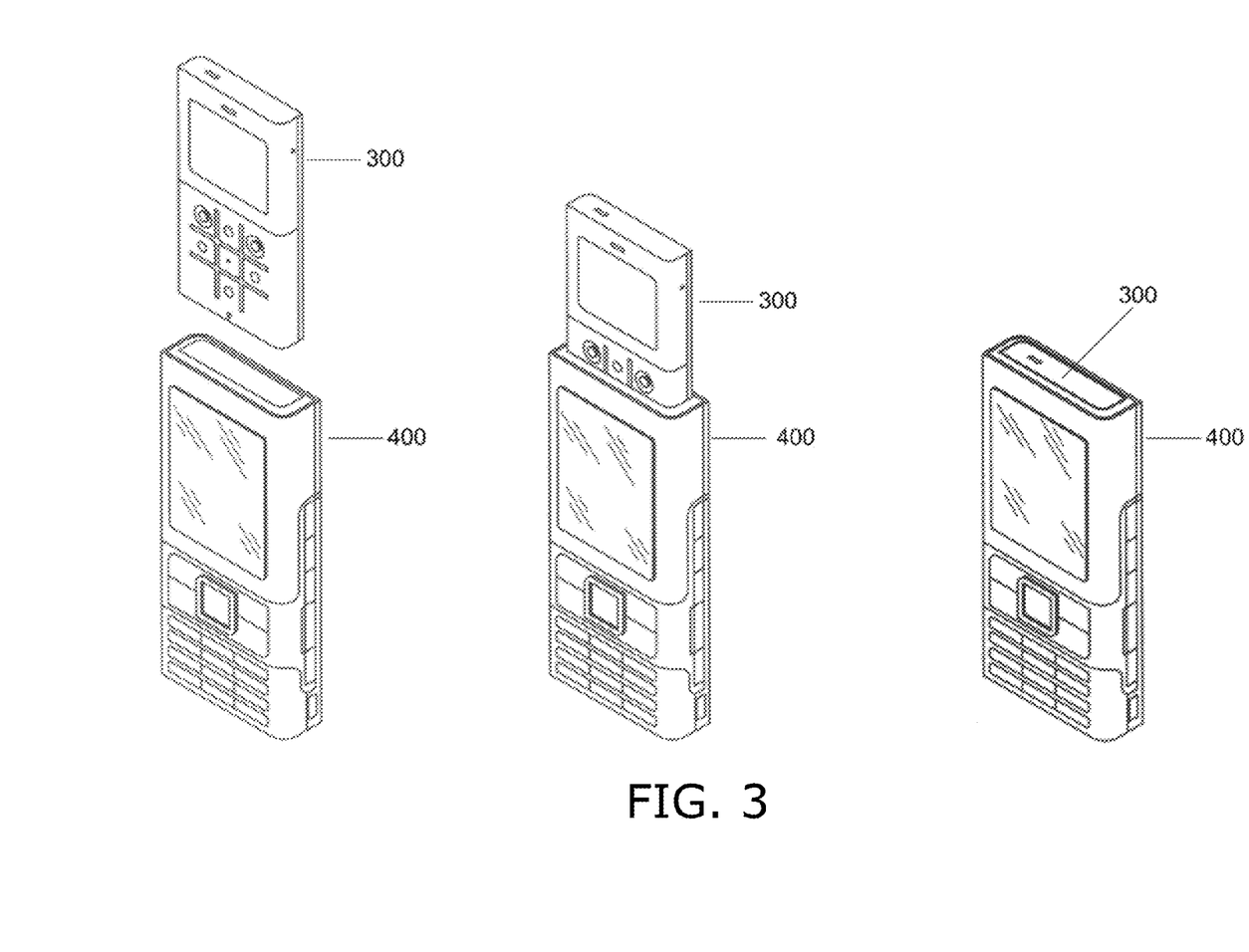
FIG. 3, which is an illustration of a modular cell phone being inserted into a jacket/host, in accordance with an embodiment of the present invention.

In this regard, reference is now made to FIG. 3, which is an illustration of a modular cell phone 300 being inserted into a jacket/host 400, in accordance with an embodiment of the present invention. Jacket/host 400 as shown in FIG. 3 includes a hollow cavity at the top for insertion of modular cell phone 300 therein.

Figure 4:
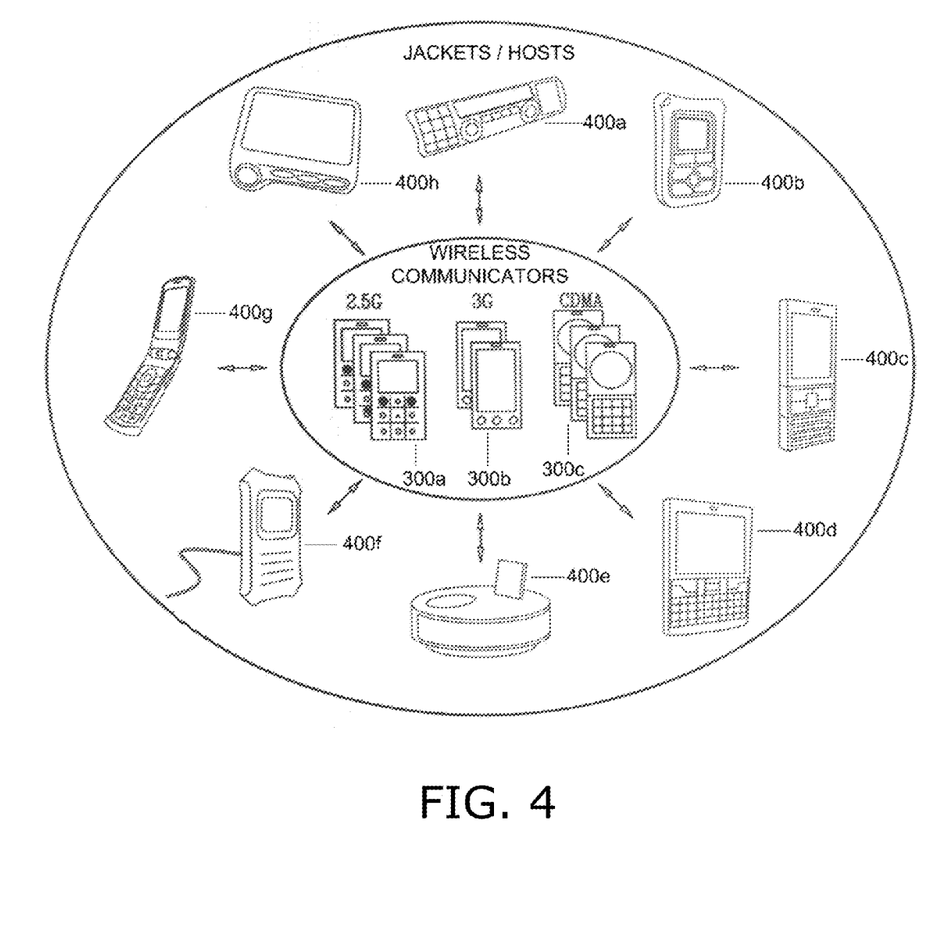
FIG. 4 is a simplified illustration of a communication system constructed and operative in accordance with an embodiment of the present invention.

Reference is now made to FIG. 4, which is a simplified illustration of a communication system constructed and operative in accordance with an embodiment of the present invention. Shown in FIG. 4 are a variety of modular cell phones 300a-300c, including 2.5G communicators for a GSM network, 3G communicators for GSM network, and CDMA communicators for a CDMA network. It will be appreciated by those skilled in the art that the networks in FIG. 4 are exemplary of a wide variety of networks and communication protocols that are supported by the wireless communicators of the present invention, such networks and communication protocols including inter alia WiFi, Bluetooth and WiMax.

Also shown in FIG. 4 are a variety of jackets/hosts 400a-400h, including car jackets/hosts, sports jackets/hosts, camera jackets/hosts, gaming jackets/hosts, etc. In accordance with an embodiment of the present invention, each modular cell phone 300a-300c may be attached to any of the jackets/hosts 400a-400h, so as to operate in combination therewith. The modular cell phones 300a-300c are substantially of the same form factor and, as such, are able to be attached to each of the various jackets/hosts 400a-400h.

Figure 5:
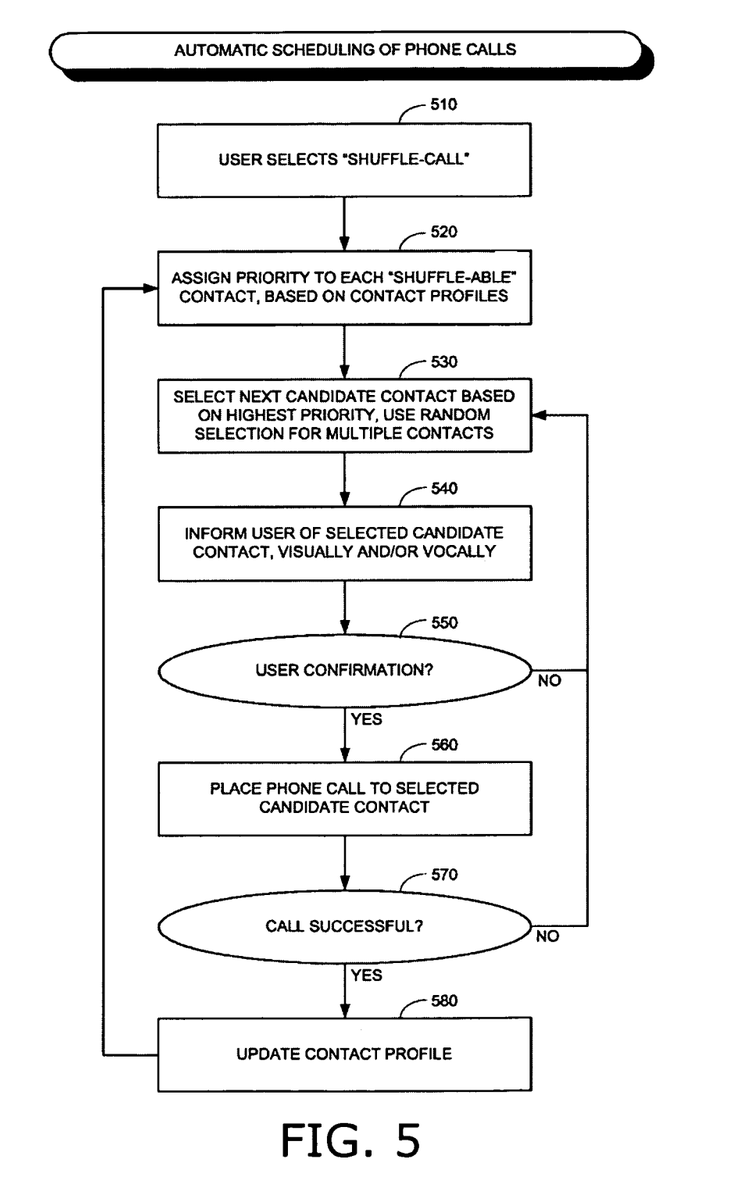
FIG. 5 is a simplified flowchart of a method for automatically scheduling phone calls, in accordance with an embodiment of the present invention.

Reference is now made to FIG. 5, which is a simplified flowchart of a method for automatically scheduling phone calls, in accordance with an embodiment of the present invention. At step 510 a user has time to speak with his contacts, and selects a "shuffle-call" function on his telephone. Some or all of the user's contacts are designated as being "shuffle-able"; i.e., contacts that the user would like to call when he has the time to speak with them.

In an alternative embodiment of the present invention, the shuffle-call is pre-scheduled by the user. For example, the user may insert a shuffle-call event into his calendar.

In yet another embodiment of the present invention, the shuffle-call is automatically suggested to the user when specific conditions prevail. The shuffle-call may be automatically suggested to the user inter alia:

when his calendar is empty, but is generally not empty most of the time;
when the user changes his status on Facebook®, or on an instant messaging service, to "available";
when a user's contact changes his status to "available" on Facebook®, or on an instant messaging service; and when telephone 100 is a modular cell phone 300, and the user inserts the communicator into a car jacket/host 400.

At step 520 priorities are assigned to the user's shuffle-able contacts, based on various factors as described hereinabove with reference to prioritizer 220. It will be appreciated by those skilled in the art that step 520 may be performed after step 510, as shown in FIG. 5, or, alternatively, step 520 may be performed at regular time intervals, such as every 30 seconds, in order that a current prioritization always be readily available. In this alternative embodiment, processing moves from step 510 directly to step 530.

At step 530 the contact with the highest priority is selected. In case more than one contact has the highest priority, then one of them is chosen by random selection.

At step 540 the user is informed of the selected candidate contact, and given the opportunity at step 550 to confirm whether or not he wishes to call the contact now. In accordance with an embodiment of the present invention, at step 540 any free-text comments in the contact's profile are presented to the user, so that the user can be reminded why he wanted to call the contact. Other information from the contact's profile may be presented to the user instead of or in addition to the free-text comments, such as the last date and time the user spoke with the contact, or today being a special occasion related to the contact. The choice of which information from the contact's profile to present to the user at step 540 is preferably configured by the user.

If the user declines at step 550, then processing returns to step 530 where the next contact in line is chosen. If the user confirms, then at step 560 a phone call to the selected contact is automatically placed. The user may configure his telephone to skip step 550, in which case phone calls to selected contacts are always placed.

The phone call placed at step 560 may or may not be successful, as determined at step 570. An unsuccessful call to a contact is one where the contact is not available, or where the call reaches a busy signal. In accordance with an embodiment of the present invention, success or non-success of a call may be determined from the duration of the call. For example, calls with duration over 15 seconds may be deemed successful.

If the call was unsuccessful, processing returns to step 530. If the call was successful, then the contact's profile is updated appropriately at step 580. Processing then returns to step 520, as long as the user continues to make phone calls.

It will be appreciated by those skilled in the art that the method of FIG. 5 enables a user to place phone calls without having to decide a-priori which contacts to call. As such, the user saves time by not having to decide who to call, and the user automatically stays in touch with friends and family.

Assignment of Priorities

Step 520 of FIG. 5 involves assigning priorities to user contacts, based on their profiles. In accordance with an embodiment of the present invention, a scoring function is used to accumulate various factors that impact the priority of a user contact. TABLE II below indicates some sample score factors, which cumulatively determine the priority.

TABLE II

Sample cumulative score factors for calculating priority for a user's contact

| Factor | Score |
|---|---|
| The current date & time is an excluded date & time for the contact | −5 |
| The current date & time is a preferred date & time for the contact | +2 |

TABLE II-continued

Sample cumulative score factors for calculating
priority for a user's contact

| Factor | Score |
|---|---|
| The current date is a special occasion for the contact | +5 |
| Urgency of speaking with the contact | +3 to +5 |
| Length of time since the last phone call with the contact | −3 to +3 |
| Closeness of relationship with the contact | +1 to +3 |
| Time remaining until deadline to speak with the contact | −3 to +3 |
| Successful call made with the contact | −5 |
| Jacket/host type of user | −5 to +5 |
| Jacket/host type of contact | −5 to +5 |

The "closeness of relationship" factor in TABLE II may be input by the user, or may be automatically derived from external databases. For example, certain contacts may have been designated by the user as "best friends" on one or more social databases.

It will be appreciated by those skilled in the art that the factors shown in TABLE II are representative of a wide variety of factors. The theme of jacket/host 400 used with modular cell phone 300 may be used in calculating priorities; i.e., contacts related to the theme of jacket/host 400 are assigned higher priorities. E.g., if modular cell phone 300 is housed in a sports jacket 400, then sports contacts are assigned higher priorities; and if modular cell phone 300 is housed in a gaming host, then gaming contacts are assigned higher priorities. Even astrological factors may be used in calculating priorities; e.g., this is a good day to call contact X, since he is an Aries.

In addition to the factors shown in TABLE II, a user's contact's priority may be changed when the contact sends to the user an SMS message requesting a phone call, or when the contact's status changes from "busy" to "available" on an Internet communication service.

Figure 6:
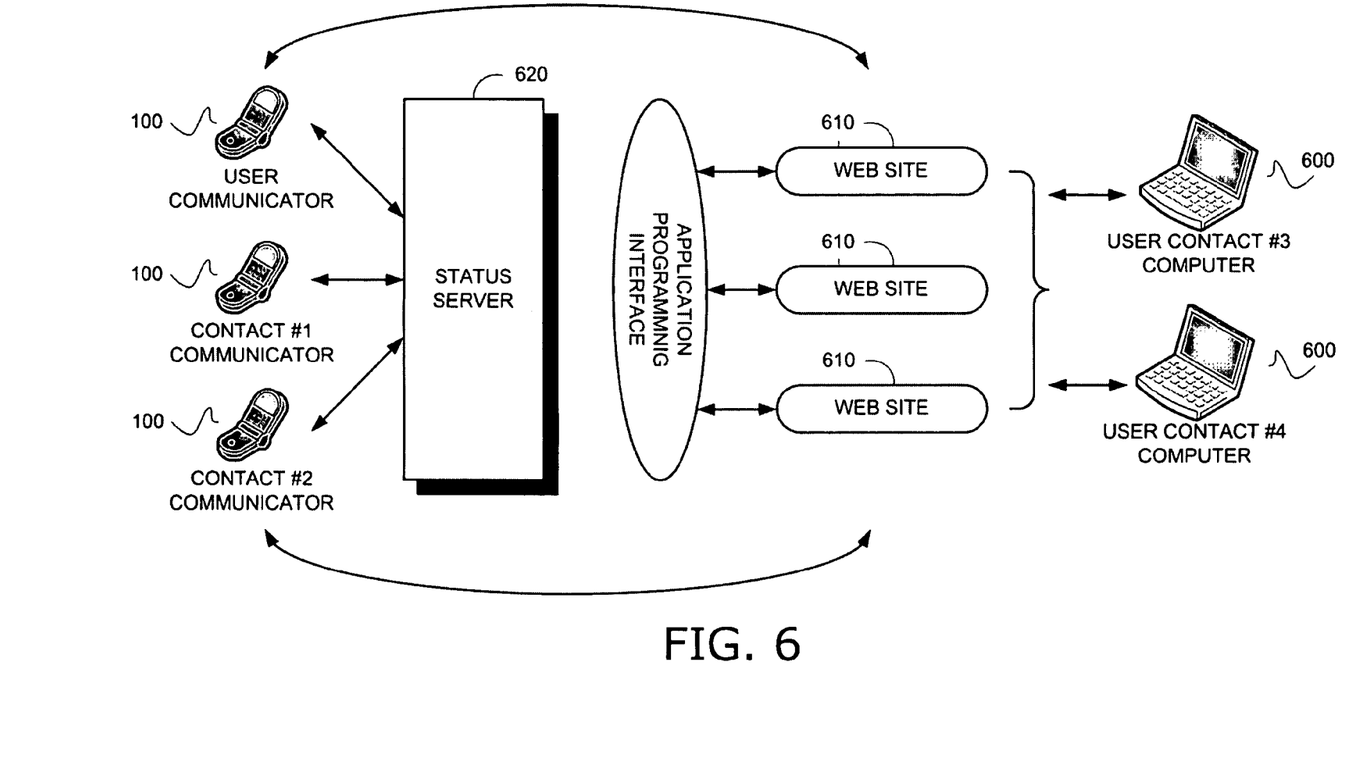
FIG. 6 is a simplified block diagram of a communication system with functionality for notifying a user when a contact's status becomes "available" on an Internet communication service, in accordance with an embodiment of the present invention.

Reference is now made to FIG. 6, which is a simplified block diagram of a communication system with functionality for notifying a user when a contact's status becomes "available" on an Internet communication service, in accordance with an embodiment of the present invention. Shown in FIG. 6 are telephones 100 belonging to a user and to two of the user's contacts, contact #1 and contact #2. Also shown in FIG. 6 are computers 600 belonging to two others of the user's contacts, contact #3 and contact #4. Computers 600 are connected to various web sites 610, which provide communication services, such as Facebook® or an instant messaging service. The communication services enable contact #3 and contact #4 to set an availability status, with settings such as "busy", "available", "running" and "on another phone call". The availability statuses are transmitted to a status server 620, which communicates with web sites 610 using an API, such as an API for XML exchange, and notifies telephones 100 when contact 3 or contact 4 becomes available.

In accordance with a first embodiment of the present invention, the user's contacts (contact #3 and contact #4) need not have telephones 100, and notification of contact availability is performed through a social network. The user's telephone 100 has a Facebook® or instant messaging application installed therein. Web sites 610 report availability of contact #3 and contact #4 to status server 620, using the API. In turn, status server 620 notifies the application in telephone 100 accordingly.

In accordance with a second embodiment of the present invention, the user's contacts (contact #1 and contact #2) each have a telephone 100, and notification of contact availability is performed directly through status server 620. Telephones 100 broadcast availability statuses to status server 620. Telephone 100 may, for example, send an HTTP request to status server 620, the request including status information of contact #1 or contact #2, and device information for the contact's telephone 100. Status server 620 maintains the status/telephone data, and reports back the status of contact #1 and contact #2 to the user's telephone 100. Status server 620 may, for example, send an HTTP response to telephone 100, or alternatively telephone 100 may download the status information from status server 620.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method for automatically scheduling phone calls, comprising:
designating at least a portion of a user's contacts, stored in the user's telephone, as being shuffle-able;
dynamically assigning priorities to the designated contacts comprising deriving scores for the designated contacts based on one or more priority impact factors;
automatically selecting one of the designated contacts based on highest priority in response to the telephone being inserted into a jacket device, wherein random selection is used in case more than one designated contact has the highest priority;
placing a phone call to the selected contact; and
dynamically reassigning the priority of the selected contact, in response to said placing a phone call successfully reaching the selected contact.

2. The method of claim 1 wherein said dynamically assigning is performed periodically at regular intervals.

3. The method of claim 1 wherein said automatically selecting is pre-scheduled by the user.

4. The method of claim 1 further comprising automatically selecting one of the designated contacts in response to the user having free time, as indicated by a user schedule.

5. The method of claim 1 wherein said automatically selecting, placing a phone call and dynamically reassigning are performed repeatedly.

6. The method of claim 1 wherein one of the priority impact factors is a special date relating to a contact.

7. The method of claim 6 wherein the special date is the contact's birth date.

8. The method of claim 6 wherein the special date is the contact's wedding anniversary.

9. The method of claim 1 wherein one of the priority impact factors is the length of time since a phone call was last made to a contact.

10. The method of claim 1 wherein one of the priority impact factors is the length of time remaining prior to a designated deadline.

11. The method of claim 1 wherein one of the priority impact factors is a metric of importance of a contact.

12. The method of claim 1 wherein one of the priority impact factors is a contact's availability status within an Internet communication service.

13. The method of claim 1 further comprising prompting the user whether or not to place a phone call to the selected contact, prior to said placing a phone call.

14. The method of claim 13 wherein said prompting the user comprises presenting text to the user reminding the user of the reason he wanted to call the selected contact.

15. The method of claim 13 wherein said prompting the user comprises presenting information to the user regarding special dates related to the selected contact.

16. The method of claim 13 wherein said prompting the user comprises presenting to the user the last date and time when the user spoke with the selected contact.

17. The method of claim 1 wherein the designated contacts comprise contacts who are awaiting replies from the user.

18. The method of claim 1 wherein the designated contacts comprise friends and family of the user.

19. The method of claim 1 further comprising importing at least one of the designated contacts from an external database of user contacts.

20. A telephone with an automatic call scheduler, comprising:
a memory for storing a plurality of a user's contacts and priorities assigned thereto, wherein at least a portion of the contacts are designated as being shuffle-able;
a prioritizer coupled with said memory for dynamically assigning the priorities to the designated contacts by deriving scores for the designated contacts based at least on one or more priority impact factors, and for dynamically reassigning the priority of a designated contact in response to a phone call being successfully made to the designated contact;
a scheduler coupled with said prioritizer and with said memory for automatically selecting one of the designated contacts based on highest priority in response to the telephone being inserted into a jacket device, wherein said scheduler uses random selection in case more than one designated contact has the highest priority; and
a dialer coupled with said scheduler for automatically placing a phone call to the selected contact.

21. The telephone of claim 20 further comprising an activation button for activating said scheduler and said dialer.

22. The telephone of claim 20 wherein said scheduler automatically selects one of the designated contacts in response to the telephone being in a moving vehicle.

23. The telephone of claim 20 wherein one of the priority impact factors used by said prioritizer is a special date relating to a contact.

24. The telephone of claim 23 wherein the special date is the contact's birth date.

25. The telephone of claim 23 wherein the special date is the contact's wedding anniversary.

26. The telephone of claim 20 wherein one of the priority impact factors used by said prioritizer is the length of time since a phone call was last made to a contact.

27. The telephone of claim 20 wherein one of the priority impact factors used by said prioritizer is the length of time remaining prior to a designated deadline.

28. The telephone of claim 20 wherein one of the priority impact factors used by said prioritizer is a metric of importance of a contact.

29. The telephone of claim 20 wherein one of the priority impact factors used by said prioritizer is a contact's availability status within an Internet communication service.

30. The telephone of claim 20 wherein one of the priority impact factors used by said prioritizer is a style of a jacket in which the telephone is housed.

31. The telephone of claim 20 further comprising a prompter for prompting the user whether or not to place a phone call to the selected contact, prior to said dialer placing a phone call.

32. The telephone of claim 31 wherein said prompter presents text to the user reminding the user of the reason he wanted to call the selected contact.

33. The telephone of claim 31 wherein said prompter presents information to the user regarding special dates related to the selected contact.

34. The telephone of claim 31 wherein said prompter presents to the user the last date and time when the user spoke with the selected contact.

35. The telephone of claim 20 wherein the designated contacts comprise contacts who are awaiting replies from the user.

36. The telephone of claim 20 wherein the designated contacts comprise friends and family of the user.

37. The telephone of claim 20 wherein the telephone is a land-line telephone.

38. The telephone of claim 20 wherein the telephone is a cellular telephone.

39. A non-transitory computer-readable storage medium storing program code which, when executed by a processor of a telephone causes the telephone:
to designate at least a portion of a user's contacts as being shuffle-able;
to dynamically assign priorities to the designated contacts by deriving scores for the designated contacts based on one or more priority impact factors;
to automatically select one of the designated contacts based on highest priority in response to the telephone being inserted into a jacket device, wherein random selection is used in case more than one designated contact has the highest priority;
to place a phone call to the selected contact; and
to dynamically reassign the priority of the selected contact, in response to the placed phone call successfully reaching the selected contact.

40. A telephone with an automatic call scheduler, comprising:
a memory for storing a plurality of a user's contacts and priorities assigned thereto, wherein at least a portion of the contacts are designated as being shuffle-able;
a prioritizer coupled with said memory for dynamically assigning the priorities to the designated contacts by deriving scores for the designated contacts based at least on a style of a jacket in which the telephone is housed, and for dynamically reassigning the priority of a designated contact in response to a phone call being successfully made to the designated contact;
a scheduler coupled with said prioritizer and with said memory for selecting one of the designated contacts based on highest priority, wherein said scheduler uses random selection in case more than one designated contact has the highest priority; and
a dialer coupled with said scheduler for automatically placing a phone call to the selected contact.

* * * * *